(12) United States Patent
Heo et al.

(10) Patent No.: US 12,424,126 B2
(45) Date of Patent: Sep. 23, 2025

(54) DISPLAY DEVICE

(71) Applicant: LG ELECTRONICS INC., Seoul (KR)

(72) Inventors: Jinha Heo, Seoul (KR); Dongheon Choi, Seoul (KR); Brian Chung, Seoul (KR); Yongnam Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 179 days.

(21) Appl. No.: 18/273,940

(22) PCT Filed: Jan. 24, 2022

(86) PCT No.: PCT/KR2022/001202
§ 371 (c)(1),
(2) Date: Jul. 24, 2023

(87) PCT Pub. No.: WO2022/169154
PCT Pub. Date: Aug. 11, 2022

(65) Prior Publication Data
US 2024/0296760 A1    Sep. 5, 2024

(30) Foreign Application Priority Data

Feb. 2, 2021   (KR) .................. 10-2021-0014599

(51) Int. Cl.
*G09F 9/30*    (2006.01)
*G06F 3/14*    (2006.01)
*G09F 9/302*    (2006.01)

(52) U.S. Cl.
CPC .......... *G09F 9/3026* (2013.01); *G06F 3/1446* (2013.01); *G09G 2300/026* (2013.01)

(58) Field of Classification Search
CPC .......... G09F 9/3026; G09F 9/302; G09F 9/33; G06F 3/1446; G06F 3/14; G09G 2300/026
See application file for complete search history.

(56) References Cited

U.S. PATENT DOCUMENTS

| | | | |
|---|---|---|---|
| 2016/0366379 A1 | 12/2016 | Hickl | |
| 2019/0122592 A1* | 4/2019 | Han | H01L 25/0753 |
| 2020/0058730 A1* | 2/2020 | Ha | H05K 5/0204 |
| 2020/0350476 A1* | 11/2020 | Lee | G09F 9/3026 |

(Continued)

FOREIGN PATENT DOCUMENTS

| | | |
|---|---|---|
| KR | 10-2017-0000096 A | 1/2017 |
| KR | 10-2017-0026399 A | 3/2017 |

(Continued)

*Primary Examiner* — Gary C Hoge
(74) *Attorney, Agent, or Firm* — Birch, Stewart, Kolasch & Birch, LLP (57) ABSTRACT

This display device comprises: a plurality of display panels arranged in a grid pattern; a fastening bracket coupled to the respective rear surfaces of the plurality of display panels; a module holder coupled to the fastening bracket by means of a resin; a control unit located on the rear surface of the module holder; and a back cover that covers the control unit and is fastened to the module holder. Since the coupling position of a display module between the fastening bracket and the module holder can be set differently for each of display modules, stepped portions and gaps between the display modules can be reduced.

9 Claims, 8 Drawing Sheets

(56) References Cited

U.S. PATENT DOCUMENTS

| | | | |
|---|---|---|---|
| 2021/0050472 A1* | 2/2021 | Kim | G09F 9/3026 |
| 2021/0134212 A1* | 5/2021 | Kim | G09G 3/3208 |
| 2021/0392764 A1* | 12/2021 | Kim | G09F 9/3026 |
| 2022/0104381 A1* | 3/2022 | Dulieu | G09F 9/33 |
| 2022/0343810 A1* | 10/2022 | Kim | H10H 29/142 |
| 2023/0186796 A1* | 6/2023 | Wan | G06F 1/1637 |
| | | | 361/729 |
| 2023/0206787 A1* | 6/2023 | Zou | G09F 9/3026 |
| | | | 361/679.01 |
| 2023/0299251 A1* | 9/2023 | Hong | H10H 29/852 |
| 2023/0335691 A1* | 10/2023 | Park | H10H 20/857 |
| 2024/0184023 A1* | 6/2024 | Sun | G02B 5/1819 |

FOREIGN PATENT DOCUMENTS

| | | |
|---|---|---|
| KR | 10-2018-0011983 A | 2/2018 |
| KR | 10-2020-0016027 A | 2/2020 |

* cited by examiner

DISPLAY DEVICE

CROSS REFERENCE TO RELATED APPLICATIONS

This application is the National Phase of PCT International Application No. PCT/KR2022/001202, filed on Jan. 24, 2022, which claims priority under 35 U.S.C. 119(a) to Patent Application No. 10-2021-0014599, filed in the Republic of Korea on Feb. 2, 2021, all of these applications being hereby expressly incorporated by reference into the present application.

TECHNICAL FIELD

The present disclosure relates to a display device having multiple display modules arranged in a grid.

BACKGROUND ART

Display devices include a display that outputs images, and various types of display devices are available depending on the size of the display. In particular, as displays have recently become thinner and are manufactured using various materials, more diverse types of display devices have been introduced.

There are various types of display devices, including portable display devices, indoor display devices, and outdoor display devices. In the case of portable displays, thin and light displays with high resolution are used to display various images on a small screen.

Indoor displays are becoming larger and thinner than in the past as display technology improves. The development of flexible displays has led to the development of curved display devices and rollable displays.

Recently, display devices that provide various kinds of content and messages through display devices rather than hardware media, such as outdoor advertisement signboards and posters, have been used. Recently, there is a need for large display devices with the rapid development of LED and OLED-based smart digital imaging devices.

A typical example of a large display is digital signage, which is a communication tool that can induce marketing, advertising, and training effects for companies, and uses experience. The digital signage is a display device that provides specific information as well as broadcast programs in public places such as airports, hotels, hospitals, and subway stations.

A light emitting diode (LED) display apparatus that employs LEDs provides superior brightness and color characteristics compared to other types of display devices (e.g., LCD type), and is widely used as an indoor/outdoor billboard, indoor/outdoor notice board, stadium scoreboard, or indoor/outdoor backdrop. In addition, it is easy to increase the size of the LED display apparatus by arranging LED panels in the form of an M×N matrix (where M and N are natural numbers) using light-emitting devices.

Large screens can be realized using small LED panels, which reduces the manufacturing cost of display devices. Also, when temporary installations or changes in location and arrangement are required, it is easy to disassemble and assemble the display devices.

For digital signage, when a single screen is constructed using multiple display panels or display devices, screen distortion may occurs due to unevenness between vertically or horizontally neighboring display panels.

DISCLOSURE

Technical Problem

An object of the present disclosure may be to provide a multi-display device capable of adjusting the height difference or elevation difference between neighboring display modules.

Technical Solution

Provided herein is a display device including a plurality of display panels arranged in a grid pattern, a fastening bracket coupled to a back surface of each of the plurality of display panels, a module holder coupled to the fastening brackets by a resin, a controller disposed on a back side of the module holder, and a back cover arranged to cover the controller and coupled to the module holder.

The fastening bracket may include a first fastening portion coupled to a back surface of each of the display panels, and a second fastening portion protruding away from the back surface of each of the display panels and coupled to the module holder by the resin.

Front surfaces of the plurality of display modules may be arranged in the same plane.

The plurality of display panels may include a first display panel having a first thickness and a second display panel having a second thickness, the second thickness being greater than the first thickness. The first fastening portion of the fastening bracket disposed on the back surface of the first display panel and the second fastening portion of the fastening bracket disposed on the back surface of the second display panel may be arranged to have a step therebetween and are coupled to the module holder at different positions in a thickness direction.

The second fastening portion may be disposed around a perimeter of the back surface of each of the display panels. The module holder may include a third fastening portion disposed laterally in parallel with the second fastening portion. The resin may be injected into a space between the second fastening portion and the third fastening portion.

The second fastening portion may be segmented into a plurality of pieces along the perimeter of each of the display panels, and the third fastening portion may include a fastening hole allowing the second fastening portion to extend therethrough. The fastening hole may have a length corresponding to a length of the second fastening portion.

The fastening hole may include a inclined surface or stepped portion having a wide back side and a narrow front side.

The display device may further include an adhesive tape arranged between the first fastening portion and each of the display panels.

The second fastening portion may be perpendicular to the first fastening portion.

Advantageous Effects

The display device according to the present disclosure has the following effects.

According to at least one of the embodiments of the present disclosure, the position of engagement between a fastening bracket of a display module and a module holder may be set differently for each display module, thereby reducing unevenness and gaps between display modules.

Since the module holder and the display module are coupled with a resin, errors may be easily compensated for and assembly may be simplified.

Further scope of applicability of the present disclosure will become apparent from the following detailed description. Various changes and modifications within the spirit and scope of the present disclosure can be clearly understood by those skilled in the art, and therefore it is to be understood that the detailed description and specific embodiments such as preferred embodiments of the present disclosure are given by way of example only.

BEST MODE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

As used herein, terms such as "includes" or "has" are intended to indicate the presence of the features, numbers, steps, operations, components, parts, or combinations thereof disclosed in the specification, and are not to be understood as precluding the possibility of the presence or addition of one or more other features, numbers, steps, operations, components, parts, or combinations thereof.

Figure 1:
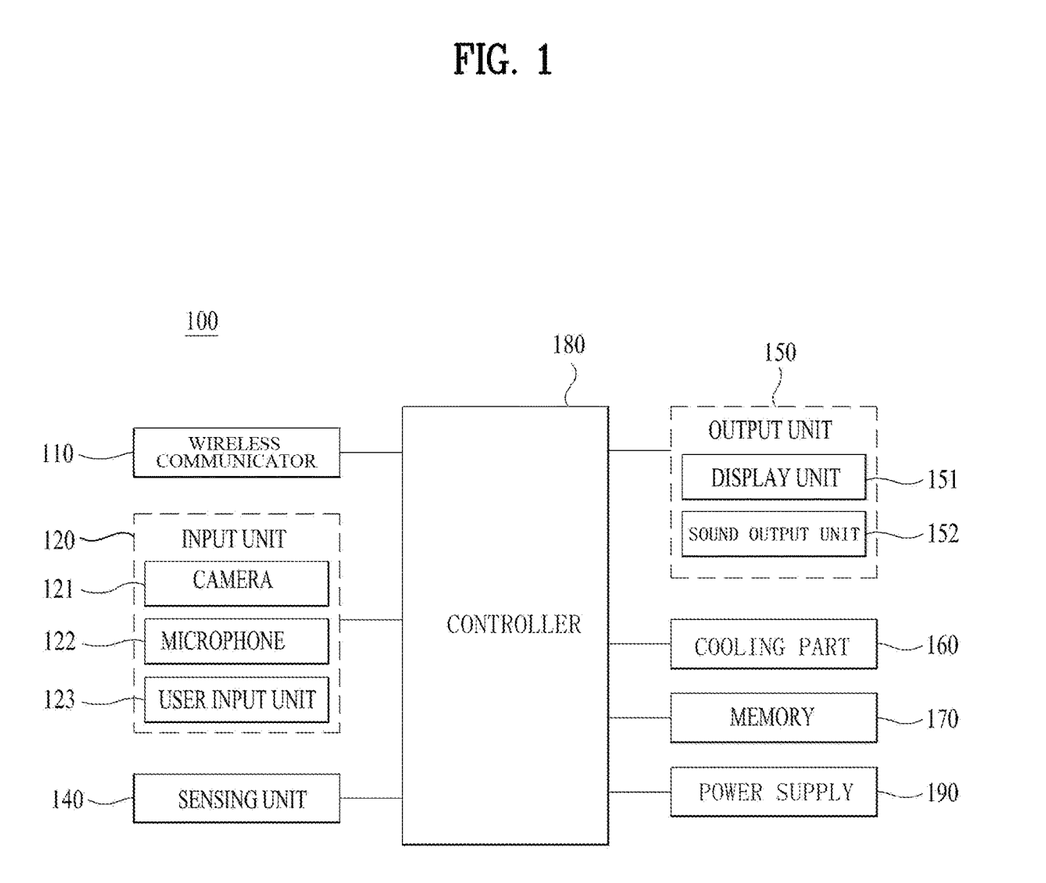
FIG. 1 is a block diagram illustrating a display device related to the present disclosure.

FIG. 1 is a block diagram illustrating a display device 100 related to the present disclosure.

The display device 100 may include a wireless communicator 110, an input unit 120, a sensing part 140, an output unit 150, a cooling part 160, a memory 170, a controller 180, and a power supply 190. The components shown in FIG. 1a are not essential to implement the display device 100, and the display device 100 described herein may have more or fewer components than those listed above.

More specifically, the wireless communicator 110 among the components may include one or more modules that enable wireless communication between the display device 100 and a wireless communication system, between the display device 100 and another display device 100, or between the display device 100 and an external server. Additionally, the wireless communicator 110 may include one or more modules that connect the display device 100 to one or more networks.

The wireless communicator 110 may include at least one of a mobile communication module, a wireless internet module, or a short-range communication module.

The input unit 120 may include a camera 121 or image input unit configured to input an image signal, a microphone 122 or audio input unit configured to input an audio signal, and a user input unit 123 (e.g., a touch key, a mechanical key, etc.) configured to input information from a user. Voice data or image data collected by the input unit 120 may be analyzed and processed as control commands from the user.

The user input unit may include a touch sensor disposed on the front of the display 151. The touch sensor may be disposed on the entire front of the display 151. For a large display, the touch sensor may be disposed on a portion of the display in consideration of the reach of the user.

The sensing part 140 may include one or more sensors configured to sense at least one of information in the display device 100, information about the environment surrounding the display device 100, or user information. For example, the sensing part 140 may include at least one of a proximity sensor, an illumination sensor, a touch sensor, an RGB sensor, an infrared (IR) sensor, a finger scan sensor, an ultrasonic sensor, an optical sensor (e.g., the camera 121), a microphone (see 122), a battery gauge, an environmental sensor (e.g., a barometer, a hygrometer, a thermometer, a radiation detection sensor, a heat detection sensor, a gas detection sensor, etc.), a chemical sensor (e.g., an electronic nose, a healthcare sensor, or a biometric sensor, etc.). The display device 100 disclosed herein may utilize pieces of information sensed by at least two of these sensors in combination.

The output unit 150 is configured to generate outputs related to visual, auditory, or tactile senses, and may include at least one of a display unit 151 and a sound output unit 152. The display unit 151 may be layered or integrally formed with the touch sensor, thereby implementing a touchscreen. Such a touch screen may function as the user input unit 123 to provide an input interface between the display device 100 and a user, and may provide an output interface between the display device 100 and the user.

The cooling part 160 represents a component that dissipates heat from the display device 100, and may include heat pipes or cooling fins, and a circulating fan configured to enhance air circulation within the display device 100, and a vent hole or the like.

When installed for the purpose of exhibition or advertisement, the display device 100 is operated for a long time and outputs high brightness to be clearly visible from the outside. Therefore, the heat generated by the display 151 and the controller 180 may affect each part of the display device 100, resulting in malfunctions, etc. . . . Therefore, a heat dissipation structure to dissipate the internal heat is very important.

In the display device 100, heat dissipation is implemented in various ways. Depending on how heat transfer is performed during the heat dissipation process, heat dissipation may be divided into air-cooling or water-cooling. In the case of air-cooling, heat dissipation efficiency can be increased by maximizing the surface area using heat fins or the like. In the case of water-cooling, heat dissipation efficiency can be increased by using a structure such as a heat pipe to guide flow and sealing of the heat transfer material.

Any of these cooling methods for heat dissipation may be used alone, or two or more of these methods may be used in combination as needed.

The memory 170 stores data that supports various functions of the display device 100. The memory 170 may store multiple application programs or applications running on the display device 100, data for operation of the display device 100, and instructions. At least some of these applications may be downloaded from an external server through wireless communication. In addition, at least some of these applications may be present on the display device 100 from the time of shipment for basic functions of the display device 100 (e.g., making and receiving calls, receiving messages, and sending messages). The applications may be stored in the memory 170, installed on the display device 100, and driven by the controller 180 to perform an operation (or function) of the display device 100.

In addition to operations related to the applications, the controller 180 generally controls the overall operation of the display device 100. The controller 180 may provide or process appropriate information or functions for the user by processing signals, data, information, etc. that are input or output through the components discussed above, or by driving applications stored in the memory 170.

Further, the controller 180 may control at least some of the components to run the applications stored in the memory 170. Further, the controller 180 may operate at least two of the components included in the display device 100 in combination to drive the applications.

The power supply 190 receives power from an external power source or an internal power source and provides power to each of the components included in the display device 100, under control of the controller 180. The power supply 190 may include a battery, which may be a built-in battery or a replaceable battery.

At least some of the components may operate in cooperation with each other to implement operation or control of the display device 100 or a method therefor according to various embodiments described below. Additionally, the operation or control of the display device 100 or the method therefor may be implemented on the display device 100 by driving at least one application stored in the memory 170.

Figure 2:
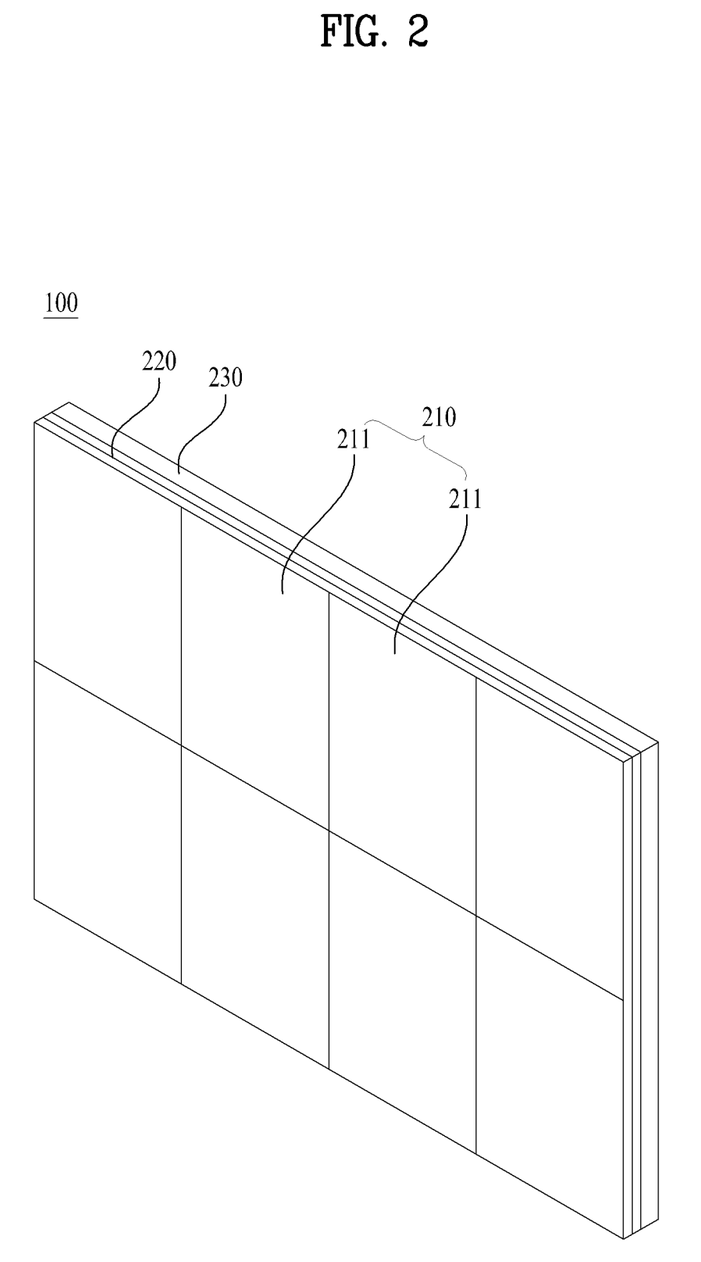
FIG. 2 is a perspective view illustrating a display device according to one embodiment of the present disclosure.
Figure 3:
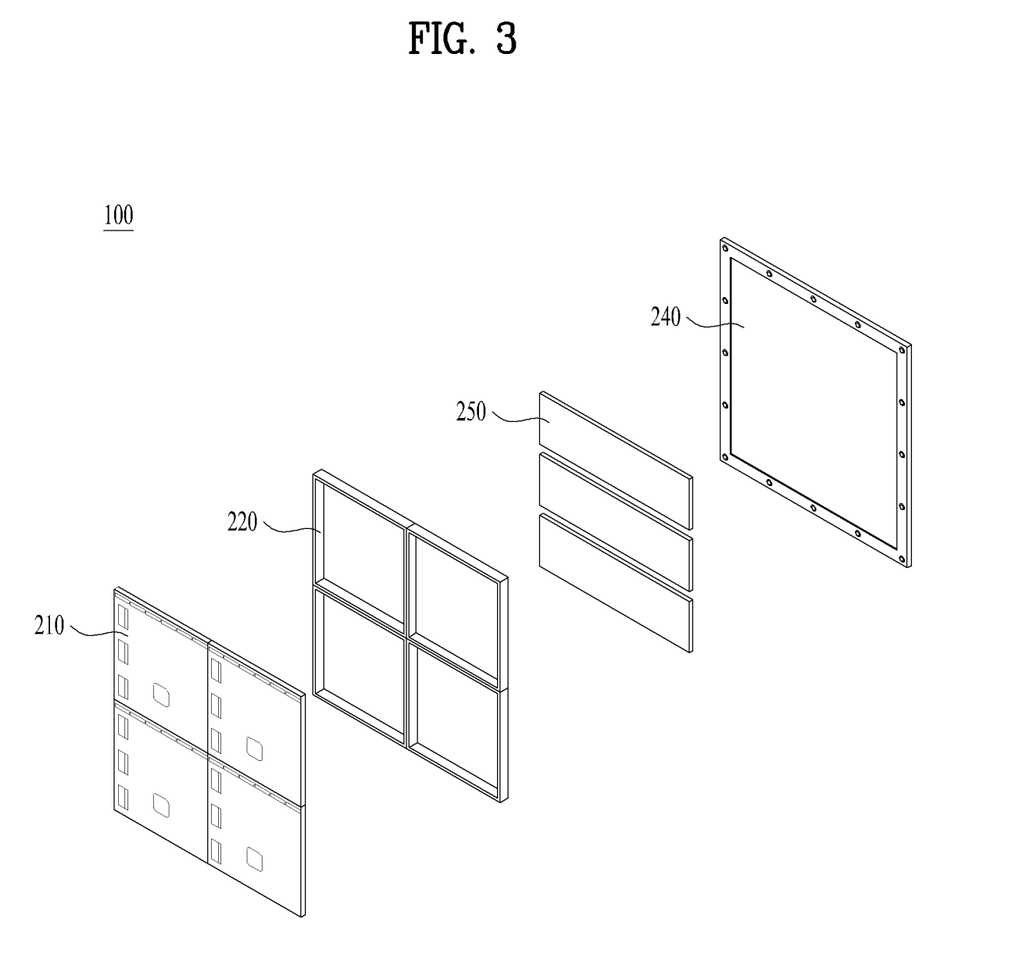
FIG. 3 is an exploded perspective view illustrating a display device according to one embodiment of the present disclosure.

FIG. 2 is a perspective view illustrating the display device 100 according to one embodiment of the present disclosure. FIG. 3 is an exploded perspective view illustrating the display device according to one embodiment of the present disclosure. Multiple display modules 210 may be arranged in a grid to implement a large-screen display device 100.

The display module 210 may include a display panel 211 that outputs images, a drive IC 212 that is responsible for driving the display panel 211, and a fastening bracket 213 to fix the display module 210.

Hereinafter, a light emitting diode (LED) panel will be described as an example of the display panel 211. However, display panels applicable to the present disclosure are not limited to LED panels. Organic light emitting diodes (OLEDs), plasma display panels (PDPs), field emission displays (FEDs), and liquid crystal displays (LCDs) are also applicable.

The display panel 211 may include a plurality of pixels R. G. B. The plurality of pixels R, G, B may be formed at each intersection of multiple data lines and multiple gatelines. The plurality of pixels R, G, B may be disposed or arranged in a matrix form.

For example, the plurality of pixels R, G, B may include a red (R) subpixel, a green (G) subpixel, and a blue (B) subpixel. The plurality of pixels R, G, B may further include a white (W) subpixel.

A side of the display panel 211 that displays the image may be referred to as a front or front side. A side of the display panel 211 on which images displayed by the display panel 211 are not observable may be referred to as a rear or back side.

The display panels 211, which output images and are arranged in a grid, may be coupled to the front of the module holder 220 located on the back to maintain the grid-like arrangement.

A drive IC positioned on the back of the display panels 211 is responsible for driving each of the display panels 211. To cover the gap from the display panels 211 created by the drive ICs, the module holder 220 may include a sidewall portion provided on the outer perimeter to have a predetermined thickness in the front-to-back direction of the display device.

To drive the plurality of display panels 211 as one display, a controller 250 that provides synchronized signals to each drive IC 212 may be disposed on the back of the module holder 220. The controller 250, which is disposed on the back of the module holder 220, may divide the image information received through the communicator or the like according to the number and arrangement of the combined display panels and transmit the same to the drive ICs 212 of each display panels 211 to drive each display panel 211.

A module cover 240 may be provided to cover the controller 250 and to shape the back appearance of the display device 100. The module cover 240 may be coupled to the module holder 220.

The module cover 240 may include a plurality of heat dissipation holes for heat dissipation, and have an opening formed to position a connector for connecting to another device or a neighboring display device.

Figure 4:
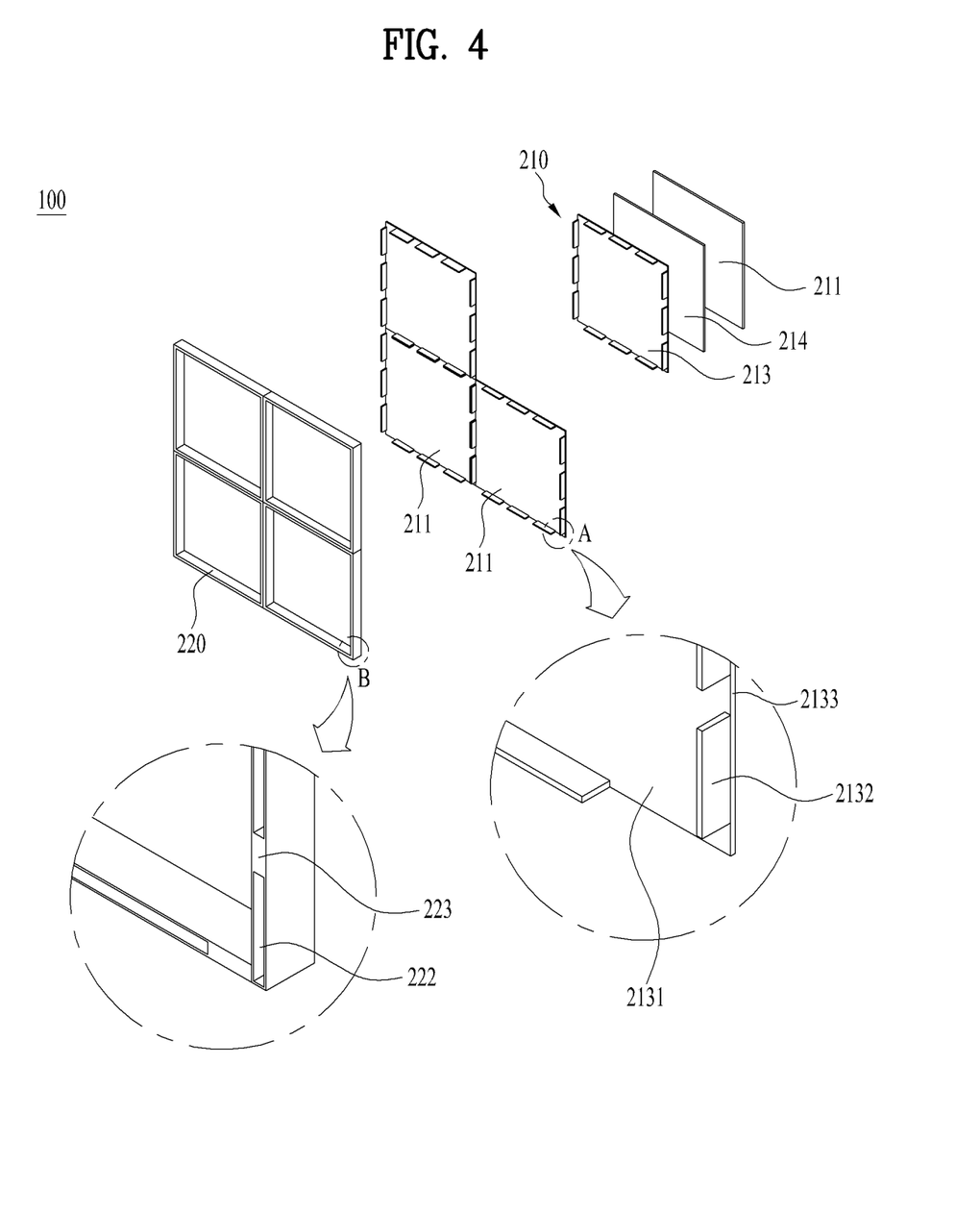
FIG. 4 is an exploded perspective view illustrating a display module and module holder according to one embodiment of the present disclosure.

FIG. 4 is an exploded perspective view illustrating the display module 210 and the module holder 220 according to one embodiment of the present disclosure. While the figure illustrates an embodiment in which four display modules 210 are arranged in a 2×2 array, the number of display modules 210 is not limited thereto.

The display module 210 includes a display panel that outputs an image on its front side and a fastening bracket 213 that is disposed on the back side and is coupled to the module holder 220. The fastening bracket 213 may include a first fastening portion 2131 that is coupled to the display panel 211 and a second fastening portion 2132 that is coupled to the module holder 220.

The first fastening portion 2131 may have a shape that covers the entire back surface of the display panel 211, as shown in FIG. 4, or may have a picture frame shape and include an opening formed by omitting a portion. The display panel 211 and the first fastening portion 2131 may be coupled using an adhesive tape 214.

The second fastening portion 2132 protrudes backwards from the first fastening portion 2131 and may be formed along the perimeter of the display panel 211.

Referring to enlarged view A of FIG. 4, the second fastening portion 2132 may be segmented along the perimeter of the display panel 211.

The module holder 220 may be formed in a picture frame shape along the perimeter of the display panel 211 and may include a third fastening portion 222 at a position corresponding to the second fastening portion 2132.

The third fastening portion 222 may be arranged to overlap the second fastening portion 2132 in a lateral direction. In this embodiment, the third fastening portion 222 may have the shape of a fastening hole 222 into which the second fastening portion 2132 is inserted.

Referring to enlarged view B, the fastening hole 222 is formed to have a limited length, because if the fastening hole 222 is excessively long, the rigidity of the module holder 220 will be weakened. In this way, a plurality of fastening holes may be formed.

Therefore, the second fastening portion 2132 may be segmented to correspond to the length of the fastening holes 222, and the connection portion 223 between the fastening holes 222 may be positioned at the segmenting portion 2133 of the second fastening portion 2132. The second fastening portion 2132 may be inserted to the third fastening portion 222 such that the module holder 220 can be coupled with the fastening bracket 213.

The second fastening portion 2132 may extend from the first fastening portion 2131 in a direction perpendicular to the first fastening portion 2131 so as to be inserted easily into the fastening hole 222.

Figure 5:
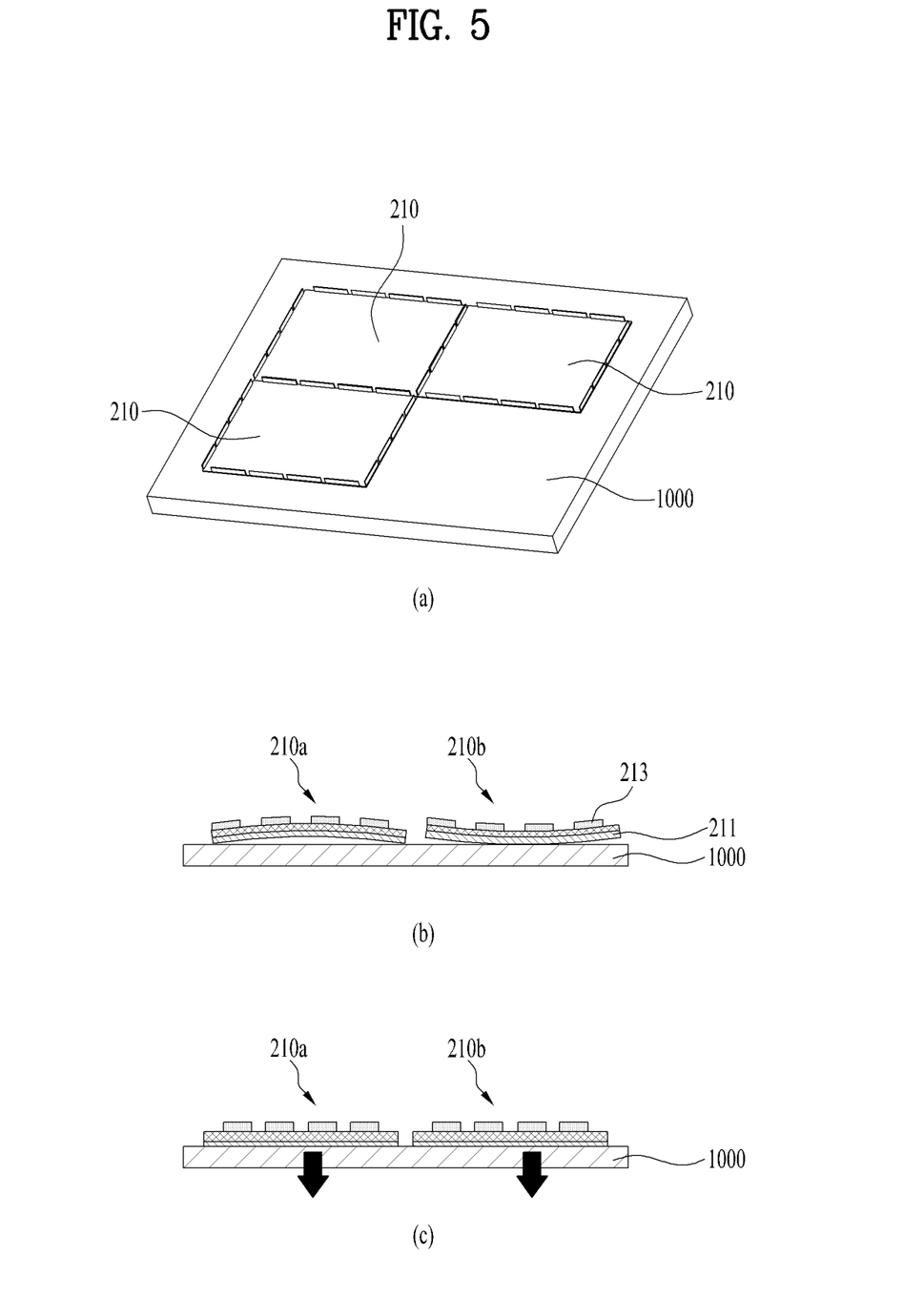
FIGS. 5 to 7 are views illustrating a method of assembling a display device according to one embodiment of the present disclosure.
Figure 6:
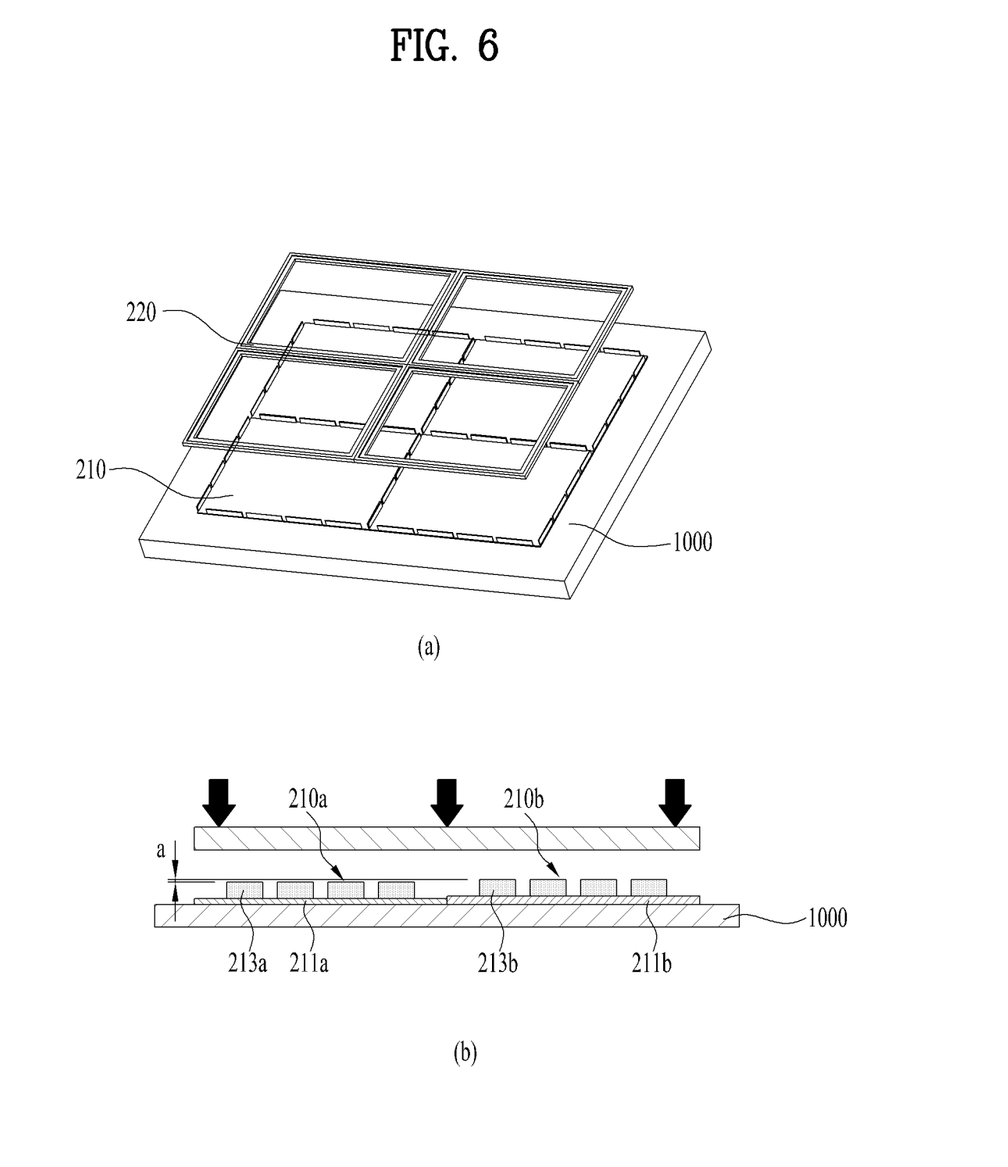
Figure 7:
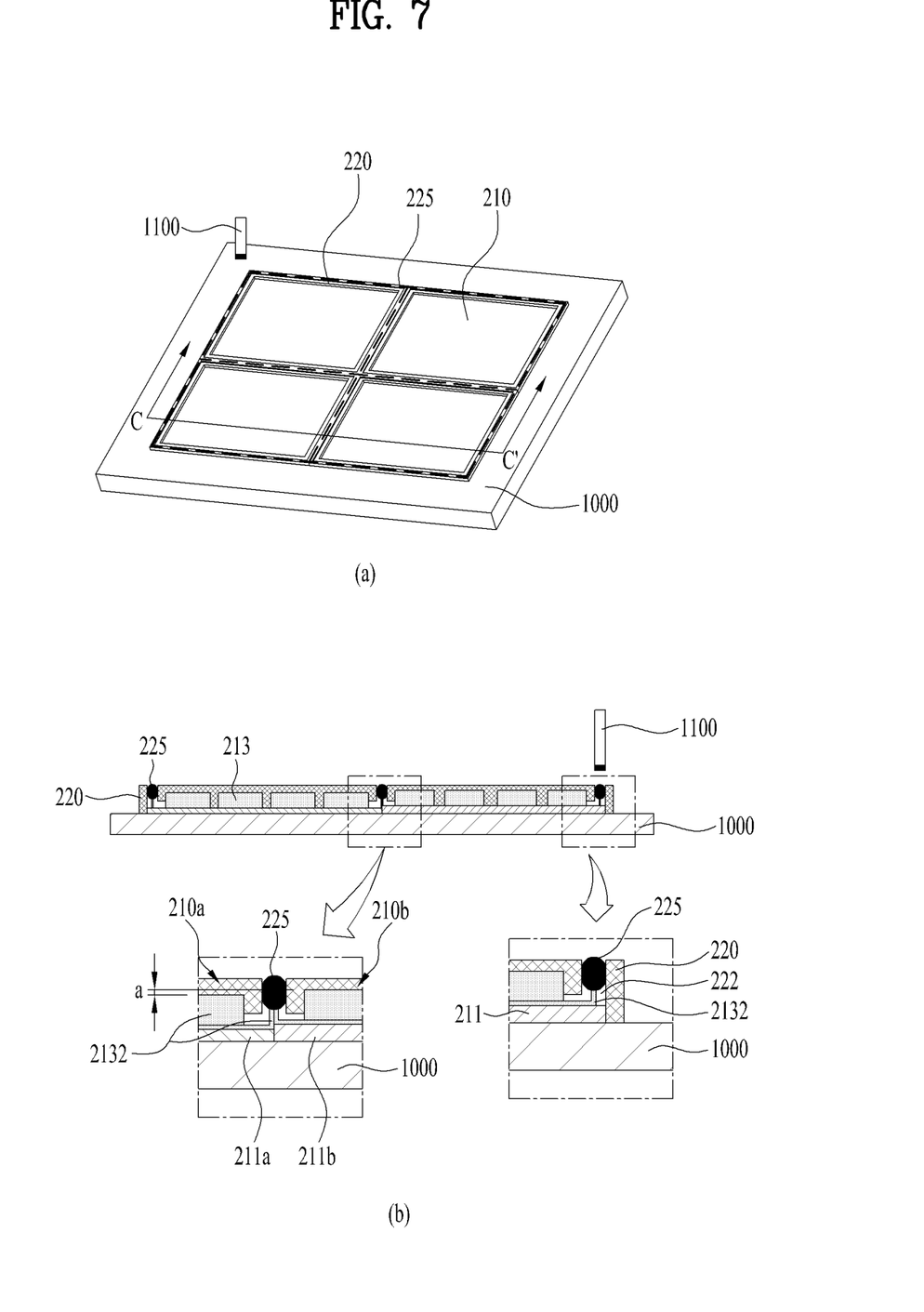

FIGS. 5 to 7 are views illustrating a method of assembling a display device according to one embodiment of the present disclosure. The display panel 211 is formed in a plurality of layers. Accordingly, the plurality of display panels 211 may have different thicknesses due to the accumulation of tolerances in each layer.

Accordingly, when the assembly is performed from the back side, the display panels 211 on the front side may have different heights. Thus, the assembly may be performed from the front side to the back side, as shown in (a) of FIG. 5. First, a plurality of display modules 210 may be arranged in a grid on the workbench 1000 such that the front surfaces of the display modules 210 face the workbench 1000.

The display modules 210 include a display panel 211 and a fastening bracket 213 coupled to the back surface thereof by an adhesive tape 214, as described above, and the second fastening portion 2132 of the fastening bracket 213 may have a shape that protrudes toward the back surface of the display module 210.

The display module 210 may be planar as a thin plate-like member, but may be warped into a curve as shown in (b) of FIG. 5 due to issues such as thermal deformation of each layer during the process of laminating a plurality of layers.

Although exaggerated in the figure, the center portion of the display module 210a may be raised, or the ends of the display module 210b may be raised.

To flatten the curved display module 210, the display module 210 may be suctioned through the suction holes formed in the workbench 1000 to flatten the display module as shown in (c) of FIG. 5.

The module holder 220 is mounted on the back surface of the display module 210 with improved flatness, as shown in (a) of FIG. 6. The module holder 220 may cover a plurality of display modules 210 simultaneously to hold the display modules 210 in a grid-like arrangement.

The module holder 220 may be mounted on the back surfaces of the display modules 210 such that the second fastening portions 2132 of each display module 210 are inserted into the third fastening portions 222 of the module holder 220.

The second fastening portion 2132 and the third fastening portion 222 may be disposed side-by-side in a lateral direction, and a predetermined gap may be formed between the second fastening portion 2132 and the third fastening portion 222.

As shown in (a) of FIG. 7, resin 225 may be injected into the fastening hole 222 to fill the gap between the second fastening portion 2132 and the third fastening portion 222 inserted into the fastening hole 222, and the module holder 220 may be coupled to the fastening bracket 213.

FIG. 7-(b) is a cross-sectional view taken along line C-C' in FIG. 7-(a). Referring to enlarged view D, resin 225 may be injected along the perimeter of the display module 210 to secure the module holder 220 and the fastening bracket 213.

However, as discussed above, due to the different thicknesses of the display panels 211, the back surface heights of the display modules 210 may differ, and thus the location of the second fastening portion 2132 may differ among the display modules 210, as shown in (b) of FIG. 6.

As one module holder 220 is coupled to a plurality of display modules 210 with different back surface heights, the length by which the module holder 220 and the second fastening portion 2132 overlap may differ among the display modules 210.

When the thickness of a first display module 210a is less than the thickness of a second display module 210b, the second fastening portion 2132 of the first display module 210a may have a shorter overlapping length by a than the third fastening portion 222. However, the overlapping extent is sufficient for coupling, and the tolerances of the display modules 210 may be compensated for such that the back surface of the display device 100 has the same height.

If the module holder 220 is fastened with a screw or the like, the tolerance may be reintroduced depending on the number of revolutions, making it difficult to compensate for the tolerance. However, when the resin 225 is used, the module holder 220 may be coupled by naturally reflecting the thickness difference.

Figure 8:
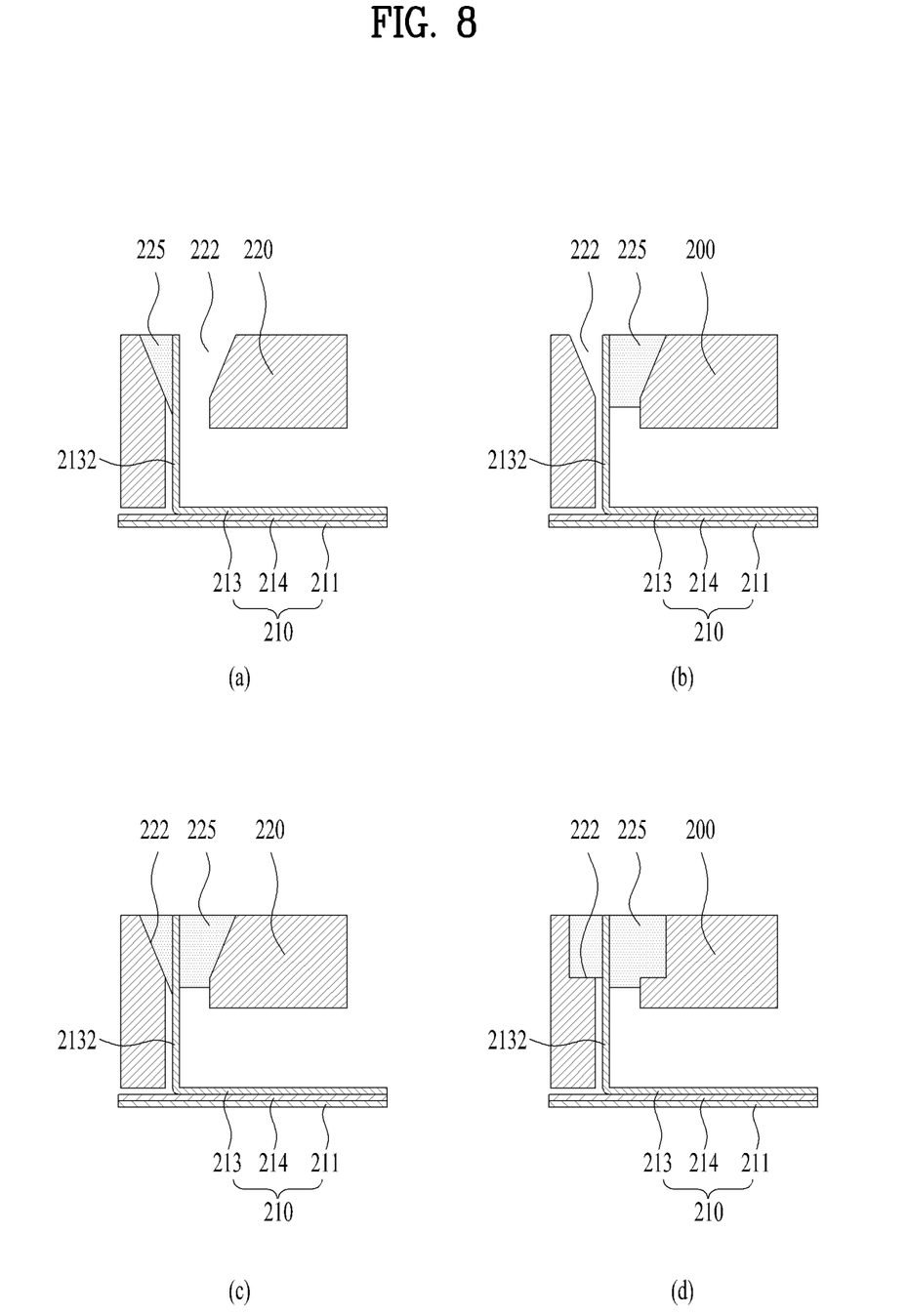
FIG. 8 is a cross-sectional view illustrating an aspect of coupling of a fastening bracket and a module holder according to one embodiment of the present disclosure.

FIG. 8 is a cross-sectional view illustrating an aspect of coupling of the fastening bracket 213 and the module holder 220 according to one embodiment of the present disclosure. To enhance the coupling between the second fastening portion 2132 and the third fastening portion 222, the third fastening portion 222 may have an inclined surface or stepped portion as shown in FIG. 8. Such an inclined surface or stepped portion of the third fastening portion 222 may increase the contact area with the resin 225, thereby enhancing the coupling.

The resin 225 may be injected only into the space between the outside of the second fastening portion 2132 and the third fastening portion 222, as shown in (a), may be injected only into the inside of the second fastening portion 2132, as shown in (b), or may be injected such that the fastening hole 222, which is the third fastening portion 222, is completely filled with the resin 225, as shown in (c). Alternatively, a step may be formed, as shown in (d).

Additionally, fine holes may be formed in the second fastening portion 2132 to enhance the coupling between the second fastening portion 2132 and the third fastening portion 222 once the resin 225 is injected.

According to at least one of the embodiments of the present disclosure, the position of coupling between the fastening bracket 213 of the display module 210 and the module holder 220 may be set differently for each of the display modules 210a and 210b, thereby reducing the difference in height and the gap between the display modules 210a and 210b.

Since the module holder 220 and the display module 210 are coupled using the resin 225, errors may be easily compensated for and assembly is simplified.

It will be apparent to one of ordinary skill in the art that the present disclosure may be embodied in other specific forms without departing from the spirit and essential features of the disclosure.

The detailed description above is not to be construed as limiting in any aspect and should be considered exemplary. The scope of this disclosure shall be determined by a reasonable interpretation of the appended claims. Thus, it is intended that the present disclosure cover the modifications and variations of this disclosure provided they come within the scope of the appended claims and their equivalents.

The invention claimed is:

1. A display device comprising:
a plurality of display panels arranged in a grid pattern;
a fastening bracket coupled to a back surface of each of the plurality of display panels:
a module holder coupled to the fastening brackets by a resin:
a controller disposed on a back side of the module holder; and
a back cover arranged to cover the controller and coupled to the module holder.

2. The display device of claim 1, wherein the fastening bracket comprises:
a first fastening portion coupled to a back surface of each of the display panels; and
a second fastening portion protruding away from the back surface of each of the display panels and coupled to the module holder by the resin.

3. The display device of claim 2, wherein front surfaces of the plurality of display panels are arranged in the same plane.

4. The display device of claim 3, wherein the plurality of display panels comprises a first display panel having a first thickness and a second display panel having a second thickness, the second thickness being greater than the first thickness,
wherein the first fastening portion of the fastening bracket disposed on the back surface of the first display panel and the second fastening portion of the fastening bracket disposed on the back surface of the second display panel are arranged to have a step therebetween and are coupled to the module holder at different positions in a thickness direction.

5. The display device of claim 2, wherein the second fastening portion is disposed around a perimeter of the back surface of each of the display panels,
wherein the module holder comprises a third fastening portion disposed laterally in parallel with the second fastening portion,
wherein the resin is injected into a space between the second fastening portion and the third fastening portion.

6. The display device as in claim 5, wherein the second fastening portion is segmented into a plurality of pieces along the perimeter of each of the display panels,
wherein the third fastening portion comprises a fastening hole allowing the second fastening portion to extend therethrough,
wherein the fastening hole has a length corresponding to a length of the second fastening portion.

7. The display device of claim 6, wherein the fastening hole comprises a inclined surface or stepped portion having a wide back side and a narrow front side.

8. The display device of claim 2, further comprising:
an adhesive tape arranged between the first fastening portion and each of the display panels.

9. The display device of claim 2, wherein the second fastening portion is perpendicular to the first fastening portion.

* * * * *